Feb. 1, 1966 T. B. BOGERT 3,233,082
PROGRAM CONTROL DEVICES
Filed Aug. 25, 1961 9 Sheets-Sheet 2

T. B. BOGERT, INVENTOR
WENDEROTH, LIND &
PONACK
ATT'YS

Feb. 1, 1966    T. B. BOGERT    3,233,082
PROGRAM CONTROL DEVICES
Filed Aug. 25, 1961    9 Sheets-Sheet 3

T. B. BOGERT, INVENTOR
WENDEROTH, LIND &
PONACK
Atty's

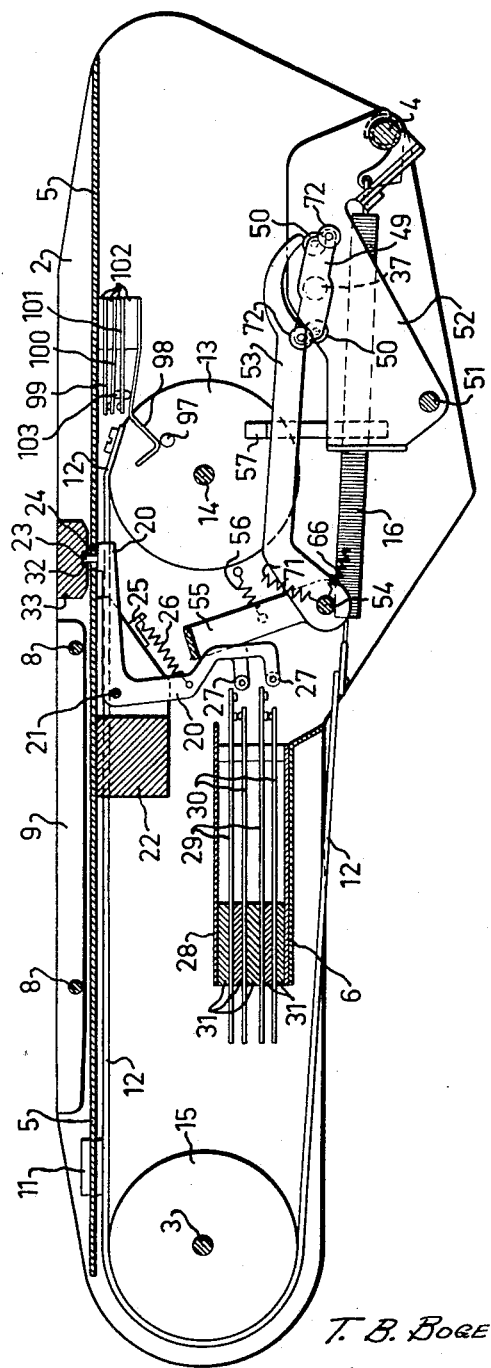

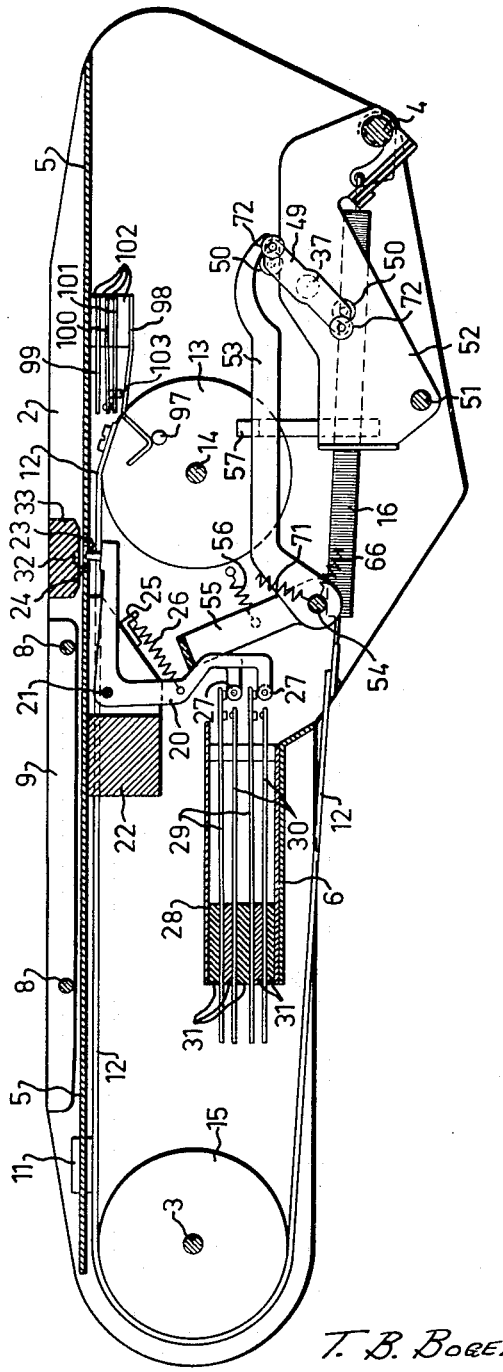

Feb. 1, 1966 T. B. BOGERT 3,233,082
PROGRAM CONTROL DEVICES
Filed Aug. 25, 1961 9 Sheets-Sheet 6
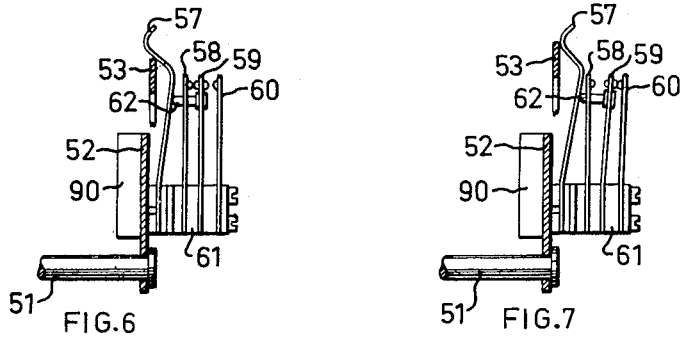
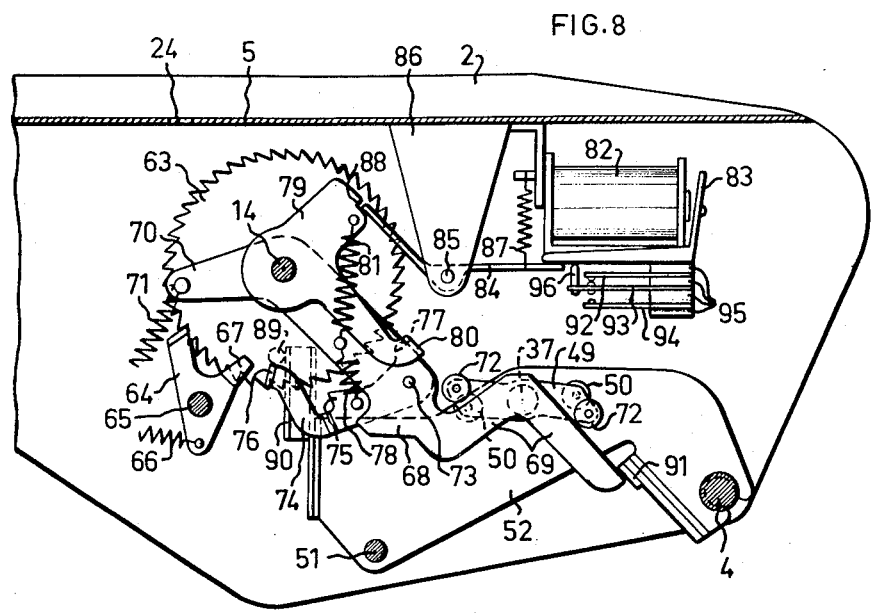

T. B. BOGERT, INVENTOR
WENDEROTH, LIND &
PONACK
ATTYS

T. B. BOGERT, INVENTOR
WENDEROTH, LIND &
PONACK
Atty's

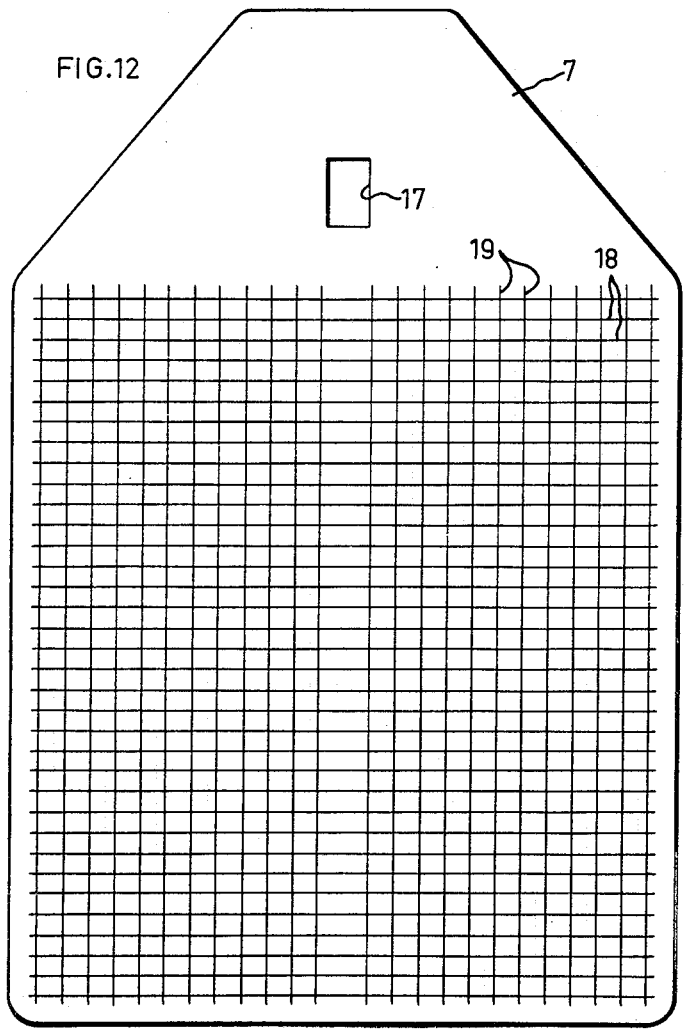

United States Patent Office 3,233,082
Patented Feb. 1, 1966

3,233,082
PROGRAM CONTROL DEVICES
Thure Bernhard Bogert, Malmo, Sweden, assignor to Aktiebolaget Addo, Malmo, Sweden, a corporation of Sweden
Filed Aug. 25, 1961, Ser. No. 134,067
2 Claims. (Cl. 235—61.11)

The present invention relates to a program control device which is characterized by the fact that it comprises a guide path along which a program control card having control holes in some of a plurality of control hole positions arranged in a square net of rows transverse to the longitudinal direction of the guide path and of channels parallel with the longitudinal direction of the guide path, is movable by a motor-driven feed mechanism, and at least one row of feeler means transverse to the longitudinal direction of the guide path, said feeler means corresponding in number to the number of channels on the card and being adapted to serve the control holes provided in the card and to enable or disable electric circuits as a function of the existence or lack of control holes in the different hole positions on the card.

A program control device of this type is very well suited for connection as an intermediate link between a data source and a data receiver to control, according to a predetermined program, the transfer of data from the data source to the data receiver. For this purpose the data channels of the data source and the data receiver are connected to the feeler means of the program control device in such a way that the transfer of data from the data source to the data receiver will be dependent on the existence or lack of control holes in the different channels of the program control card. By exchanging program control cards it is thus extremely easy to turn from one program to another without any alterations in the data source and the data receiver. Besides, it will be possible at certain stages of the program to supply fixed data to the data receiver directly from the program control card without the intermediary of the data source. Although the present invention first of all concerns the design of the program control device and not the connection thereof to the data source and data receiver, it should be mentioned by way of example that the device can be used as an intermediate link between an adding or bookkeeping machine and a tape punch, but the invention is not limited thereto, as the program control device according to the invention can be connected between a very large number of different types of data receivers and data sources, between which data are to be transferred electrically in a plurality of channels according to a predetermined program.

For a better understanding of the invention an embodiment thereof will be described in more detail in the following, reference being had to the accompanying drawings, in which:

FIG. 4 is a section substantially on line IV—IV in FIG. 2, certain parts having been omitted so that the figure substantially only illustrates the feeler means, the feeler operating means and the card moving means of the device in the initial position thereof;

FIG. 5 is a view corresponding to FIG. 4 but shows the parts in an intermediate position during a feed step of the card;

FIG. 6 is a section on line VI—VI in FIG. 2 and illustrates a switch actuated by the feeler operating means of the device, in position of rest;

FIG. 7 is a view corresponding to FIG. 6 but shows the switch actuated by the feeler operating means in active position;

FIG. 8 is a section substantially on line VIII—VIII in FIG. 2 and shows substantially only a step feed mechanism for the program control card of the device, the parts being shown in initial position;

FIG. 12 is a view of a program control card as used in the device.

Figure 1:
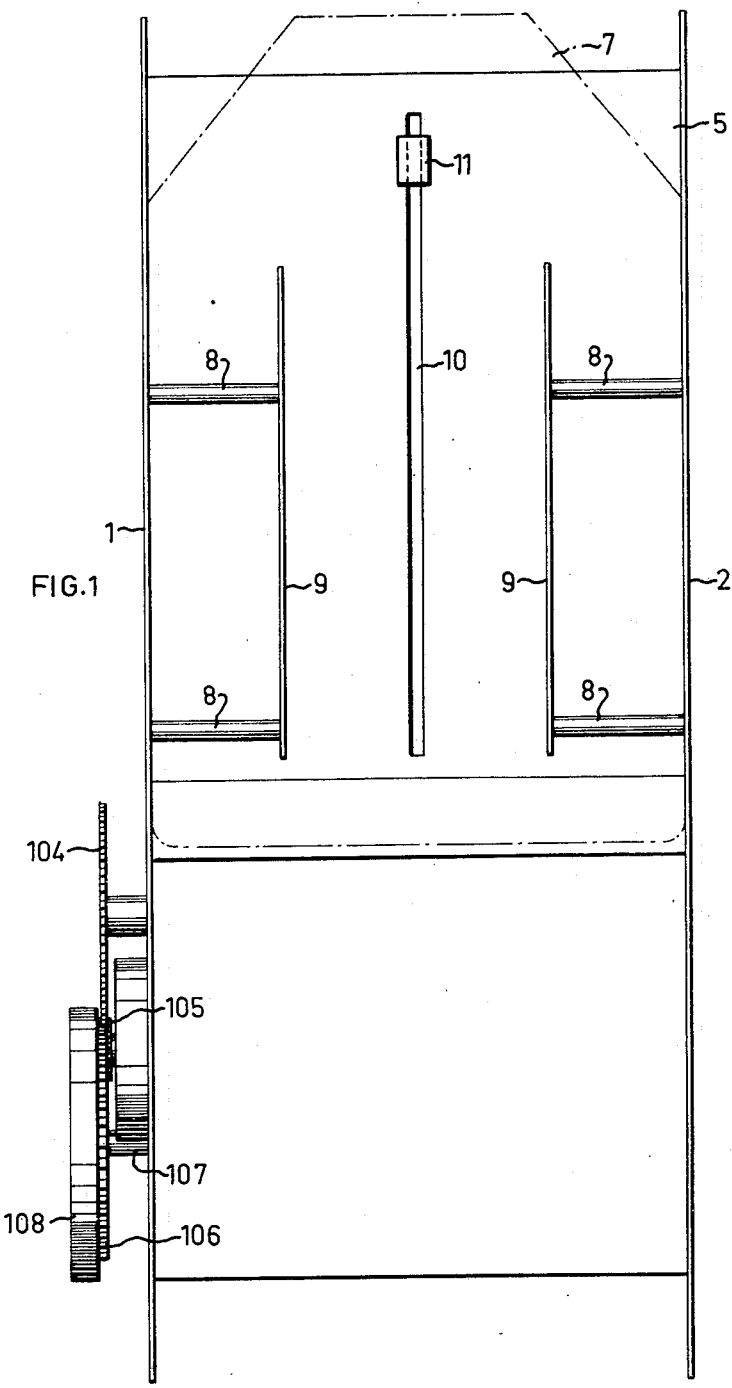
FIG. 1 is a plan view of a program control device according to the invention.

The device illustrated in the drawings comprises two frame end walls 1 and 2 which are interconnected by two rods 3, 4, a table 5 and a frame plate 6. Table 5 and end walls 1 and 2, which slightly project from said table, form a guide path for a program control card 7 which is indicated by dash and dot lines in FIG. 1 and is shown separately in FIG. 12. Secured to the walls 1, 2 by rods 8 are two guide bars 9 which extend in parallel with the end walls and are spaced a small distance from table 5 to keep the program control card 7 down against table 5. Extending in parallel with end walls 1, 2 over part of the length of table 5 is a central slot 10 (FIG. 1), and movably guided in said slot is a dog 11 which is secured to a band 12. One end of band 12 is secured to the periphery of a wheel 13 (FIGS. 2, 4, 5) which is secured on a shaft 14 mounted in end walls 1, 2. Band 12 passes from wheel 13 along the underside of table 5 and along slot 10 to a return pulley 15 which is mounted for rotation on shaft 3 and about which the band is bent approximately 180°. The other end of band 12 is connected to one end of a tension spring 16 which has its other end attached to rod 4. By rotating shaft 14 clockwise as seen in FIGS. 4 and 5 dog 11 can thus be moved to the right as seen in said figures against the action of spring 16, and at release of shaft 14 spring 16 is able to pull dog 11 back to the initial position shown in FIGS. 1 and 4.

The design of the program control card 7 is apparent from FIG. 12. The card has a rectangular main part and an integral end flap in which a hole 17 is provided, by means of which the card is passed onto dog 11 (FIGS. 1, 4, 5) so that the card is carried along in the above-mentioned movements of dog 11 and is guided along the guide path formed by table 5, end walls 1, 2 and bars 9. The rectangular main part of the card is adapted for program control holes corresponding to a desired program. In dependence on the program, holes can be provided in any hole positions whatever on the card. These hole positions are arranged in a square net indicated in FIG. 12. The square net comprises rows 18 transverse to the longitudinal direction of the guide path and thereby to the lateral edges of the card, and channels 19 parallel to the longitudinal direction of the guide path and thereby to the lateral edges of the card. The hole positions are of course located at the crossings between rows 18 and channels 19. In FIG. 12 the control card is shown to have thirty-five rows and twenty-four channels but any other number of rows and channels may be employed.

Figure 2:
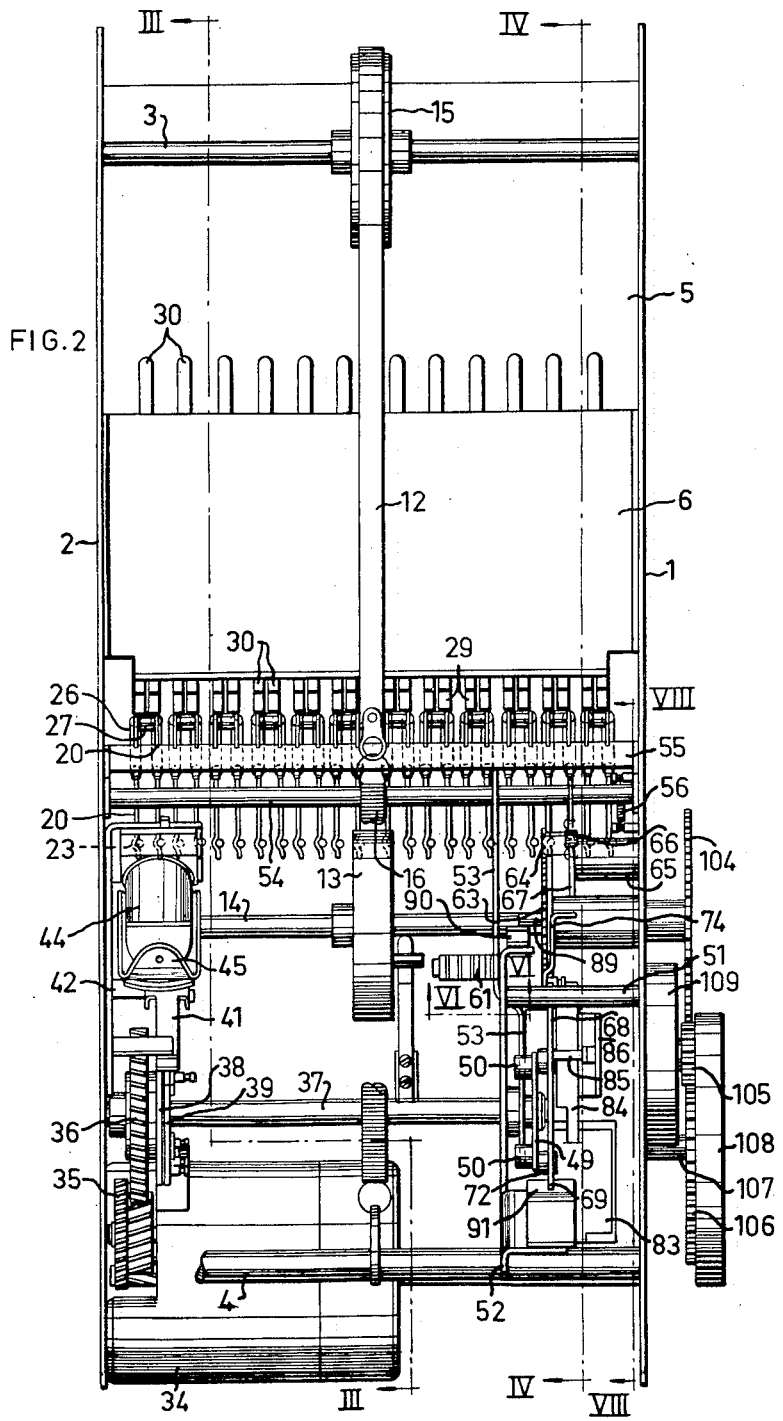
FIG. 2 is a bottom view of the device in FIG. 1.

To feel the existence or lack of control holes in the successive rows 18 of control card 7 the device has a number of feeler means which correspond to the number of channels 19 on card 7 and which in the embodiment illustrated are arranged in a row transverse to the longitudinal direction of the guide path, although they could also be disposed in several rows. Each of the feeler means have a bellcrank lever 20, and these bellcrank levers are mounted on a common shaft 21 which is secured in frame end walls 1, 2 and extends through a rack 22 the teeth of which guide the bellcrank levers. Said bellcrank levers 20 are shown in FIGS. 2, 4 and 5, but in FIG. 2 only one pair of bellcrank levers are indicated to avoid crowding of the drawing, and rack 22 is omitted. One arm of bellcrank levers 20 extends along the underside of table 5 and is provided with a feeler pin 23. Table 5 has a row of holes 24 transverse to end walls 1, 2, opposite the feeler pins 23. For each channel 19 on control card 7 there is one hole 24 and consequently there is one hole also for each feeler pin 23. Extended between each bellcrank lever 20 and a spring fastening 25 on the rack 22 is a tension spring 26 which tends to swing the respective bellcrank lever 20 counterclockwise as seen in FIGS. 4 and 5. Every second bellcrank lever 20 has a longer downwardly directed arm than the others, for reasons of space (FIGS. 4, 5). Mounted on one side of the free end of the long bellcrank lever arms is a roller 27 of electrically insulated material, and a similar roller 27 is mounted on the other side of the free end of the short lever arms. These rollers 27 are adapted, in a manner to be described in the following, to operate one feeler switch each. These switches are mounted in a common frame 28 on frame plate 6 (FIGS. 4, 5). Although the switches may be of any optional type, e.g. single or multipole switches of the make contact or rest contact type or of the reversing type, said switches are shown in the drawings as constituted each by a long contact spring 29 and a short contact spring 30 which near one end are clamped between electrically insulating disks 31 and frame 28 so that they are insulated from each other. Both contact springs 29, 30 of each switch in the unactuated state bear against one another at their ends facing bellcrank levers 20, and springs 29 extend farther towards the bellcrank levers 20 than do springs 30. The switches 29, 30 are disposed in pairs above each other on two different levels in correspondence to the different levels of rollers 27 of bellcrank levers 20.

If the device occupies the position of rest shown in FIG. 4 and if a control hole in program control card 7 is opposite one of the holes 24 in table 5, spring 26 of the corresponding bellcrank lever 20 has swung the bellcrank lever counterclockwise to the position shown in FIG. 4, in which the feeler pin 23 projects upwardly through hole 24 of table 5 and the control hole in the program control card (not shown in FIG. 4) so that the upper end of pin 23 engages in a groove 32 in a protective rail 33 extending between end walls 1, 2 over the row of holes 24, roller 27 of the respective bellcrank lever 20 being removed from the associated contact spring 29 which consequently makes contact with the associated contact spring 30 for closing a program control circuit of some desired nature. However, if there is no control hole in program control card 7 opposite a hole 24 in table 5, spring 26 will keep feeler pin 23 applied against the card which then supports itself against protective rail 33. In such a case the associated bellcrank lever 20 is swung clockwise from the position in FIG. 4 (not entirely to the position according to FIG. 5) so that roller 27 of the bellcrank lever engages the associated contact spring 29 and keeps it spaced from the associated contact spring 30, whereby the control circuit belonging to springs 29 and 30 is kept open. It is thus evident that by advancing program control card 7 in steps along table 5 and by feeling the control holes in the different rows of the card between the feed steps the switches 29, 30 can be closed and opened in any desired sequence and combination that is determined by the position of the holes in the program control card.

Figure 3:
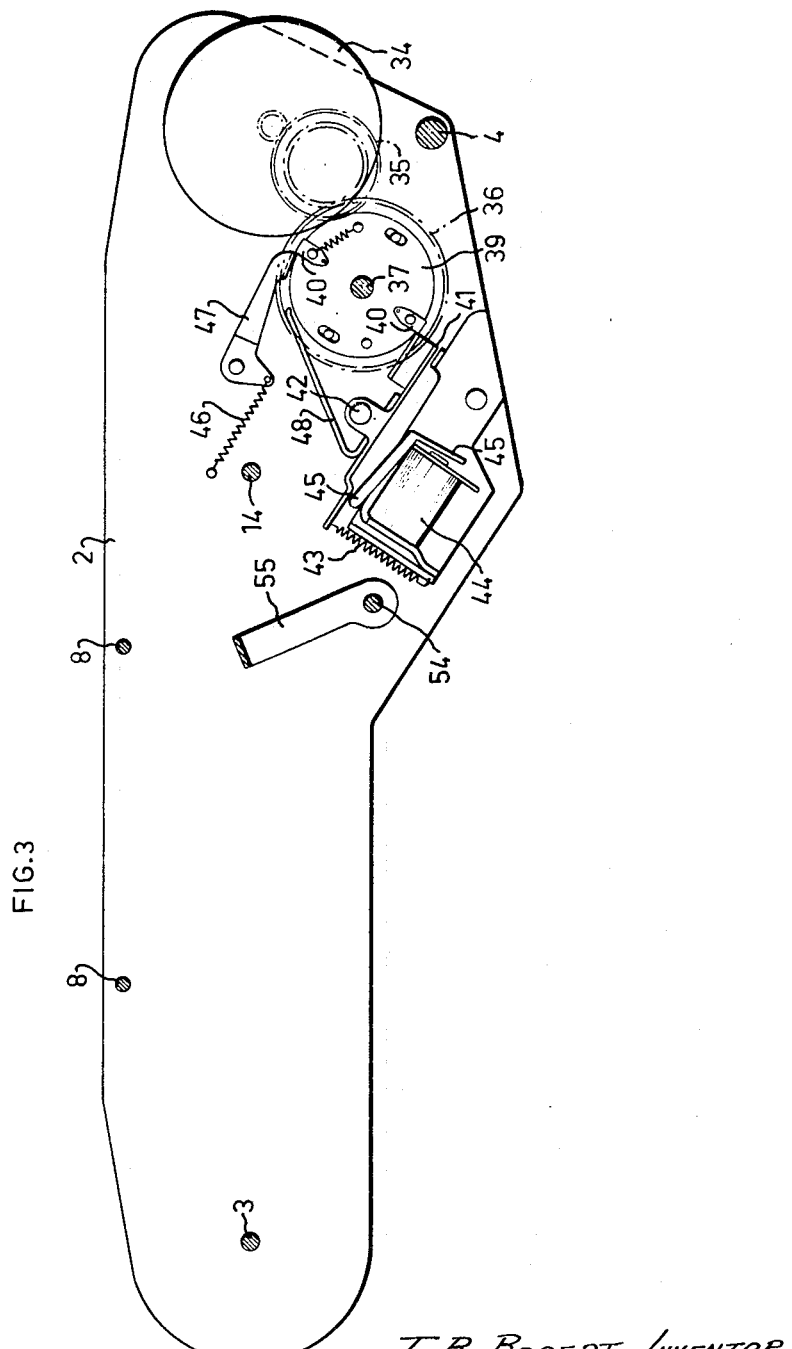
FIG. 3 is a section on line III—III in FIG. 2, illustrating substantially only the motor drive of the device, including a one cycle clutch and associated operating means with the parts in initial position.
Figure 9:
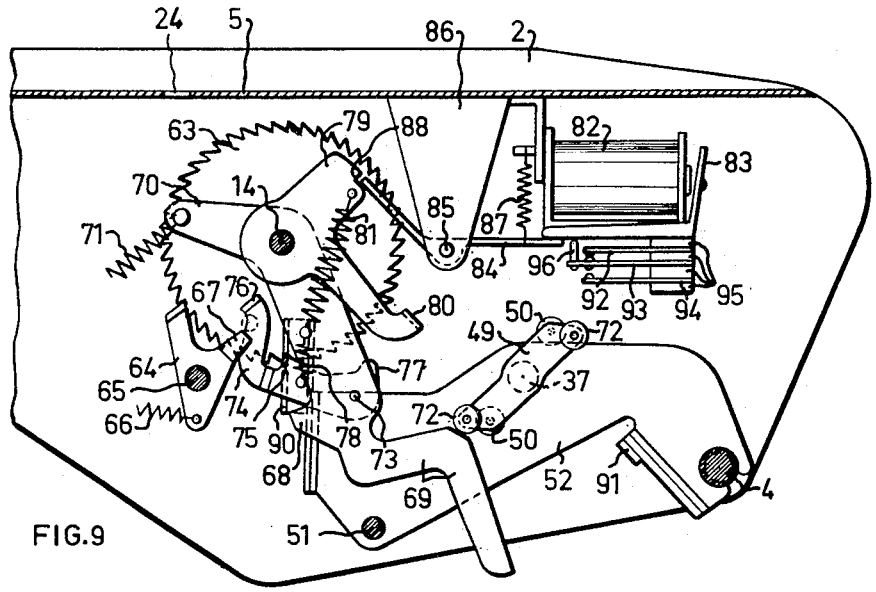
FIG. 9 is a view corresponding to FIG. 8 but shows an intermediate position of the step feed mechanism during the advance of the program control card in steps.

For advancing program control card 7 in steps there is provided a feed mechanism described in the following which is driven by a motor 34. Said motor also serves to drive other mechanisms in the device. It is secured to end wall 2 and over a reduction gearing 35 (FIGS. 2, 3) drives a gear 36 freely rotatably mounted on a shaft 37 (the main drive shaft of the device) which is mounted for rotation in end wall 2 and a frame plate 52 parallel with end wall 2 and secured to end wall 1 by means of a journal 51 and rod 4. Gear 36 constitutes the driving member of a one-cycle clutch which may be of any known type whatever and will not therefore be described here in detail. In the embodiment illustrated it is assumed that the driven member of the one-cycle clutch is a clutch disk 38 secured to the shaft 37, a rotatably mounted control disk 39 and two control hooks 40. The clutch is engaged (i.e. gear 36 is coupled to the disk 38 and thus to the shaft 37) when control hooks 40 are unactuated, but disengaged when either control hook 40 engages a control pawl 41. Control pawl 41 is pivotally mounted on a pin 42 on end wall 2, and a tension spring 43 extended between pawl 41 and the frame tends to keep pawl 41 constantly applied against the periphery of disk 36, 38 in the path of motion of clutch hooks 40, which extend from this periphery. An electromagnet 44 fixed to end wall 2 has a swingable armature 45 which is adapted to swing pawl 41 clockwise from the initial position according to FIG. 3 away from the range of motion of clutch hooks 40 so that the clutch is engaged when electromagnet 44 is energized. During the advance of program control card 7 in steps from its first row of hole positions to the last row thereof electromagnet 44 is supplied only with a short current pulse for each step so that after the release of one clutch hook 40 pawl 41 is immediately returned by spring 43 into application against the periphery of disks 38, 39 and is thus ready to catch the other coupling hook 40 to disengage the clutch after shaft 37 has been rotated through half a revolution. When one clutch hook 40 meets pawl 41 at the end of an operating cycle of the clutch and thus disengages the latter, i.e. releases gear 36 from shaft 37, a latch 47 actuated by a spring 46 simultaneously engages the other clutch hook 40 in such a way that the driven member 38 of the clutch and thus also shaft 37 is locked against rotation until electromagnet 44 is again energized for engagement of the clutch. In the embodiment illustrated use is thus made of a one-cycle clutch the operating cycle of which comprises half a revolution. However, for a purpose to be indicated in the following this operating cycle has to be modified in the embodiment illustrated in such a manner that the clutch can be disengaged temporarily during its operating cycle. For this purpose clutch pawl 41 has a momentary disengagement means in the form of an arm 48 which projects close to the periphery of the clutch disks 38, 39. In the position shown in FIG. 3 of the parts, in which pawl 41 is in application against the periphery of the disks 38 the free end of arm 48 is spaced such a distance from the periphery of the disks 38, 39 that clutch hooks 40 are able freely to pass the arm 48. When on the other hand electromagnet 44 is energized and thus swings pawl 41 clockwise from the position in FIG. 3 arm 48 is applied against the periphery of the disks 38, 39. When one-cycle clutch 36, 38, 39 shall thus effect a modified operating cycle, electromagnet 44 is not supplied with a short current pulse for engagement of the clutch but with a longer current pulse so that arm 48 catches clutch hook 40 released by pawl 41 and disengages the clutch in an intermediate position during the operating cycle. When electromagnet 44 is again deenergized spring 43 swings pawl 41 and arm 48 clockwise as seen in FIG. 3 whereby arm 48 releases clutch hook 40 so that the clutch can complete its operating cycle which is concluded by the engagement between clutch pawl 41 and second clutch hook 40.

In the initial position of the device shown in FIG. 4 some of feeler pins 23 are applied against program control card 7 (not shown in this figure) while other feeler pins 23 engage in holes in the program control card, as earlier described. When the program control card is to be advanced stepwise feeler pins 23 thus first have to be moved away from the program control card. This is done by the following feeler operating means. Non-rotatably secured to the main shaft 37 which makes half a revolution during each operating cycle of clutch 36, 38–40 is an arm 49 (FIG. 4) which projects in opposite directions from shaft 37 and which on one side carries two diametrically opposed rollers 50. The curved end of an arm 53 which is non-rotatably secured to a shaft 54 projects into the range of motion of said rollers. Shaft 54 is mounted for rotation in frame end walls 1, 2. There is also non-rotatably secured to the shaft 54 a U-shaped member 55 the transverse part of which extends along the row of bellcrank levers 20. A pair of tension springs 56 extended between the U-shaped member 55 and the respective end wall 1, 2 keep arm 53 permanently applied against rollers 50. At the beginning of an operating cycle of clutch 36, 38–40 one of the rollers 50 swings arm 53 counter-clockwise from the position in FIG. 4 to the position in FIG. 5, the U-shaped member 55 being pressed against bellcrank levers 20, swinging them clockwise so that feeler pins 23 are moved away from the program control card and contact springs 29 are moved away from contact springs 30, as shown in FIG. 5. As a consequence, the program control card is released from feeler pins 23 so that it can be advanced stepwise through a hole position row in the manner described in the following. At the end of the operating cycle of clutch 36, 38–40 springs 56 return arm 53 and U-shaped member 55 to the position shown in FIG. 4 so that feeler pins 23 are able to feel a new row of holes in the program control card which meanwhile has been advanced stepwise. Secured to frame plate 52 is a switch the operating arm 57 of which (FIGS. 4–7) projects into the path of motion of arm 53. In the embodiment illustrated the switch has three contact springs 58–60 which have their one ends clamped into an electrically insulating socket 61 which is fixed to frame plate 52 and also carries operating arm 57. Intermediate contact spring 59 is applied with an insulating pin 62 against operating arm 57. In the initial position (shown in FIG. 6) contact springs 58 and 59 make contact with each other. When swung by rollers 50 to the FIG. 5 position, arm 53 actuates operating arm 57 which by means of pin 62 swings contact spring 59 away from contact spring 58 into application against contact spring 60, as is shown in FIG. 7. Switch 57–62 can be used for delivering a signal to the effect that a stepwise advance of the program control card is being effected, to control means and apparatus of optional type which are connected to program control devices, but can also be used for other purposes. For instance, contact springs 58, 59 may be connected in a line through which a current pulse is sent to electromagnet 44 for a stepwise advance of the program control card so that this current pulse is definitely concluded with the aid of arm 53 before a clutch hook 40 (FIG. 3) has had time to move the entire distance from engagement with pawl 41 to engagement with arm 48. This will definitely prevent disengagement of clutch 36, 48–40 by means of arm 48 before the clutch has completed its entire operating cycle which comprises half a revolution. If desired, several switches can be operated with arm 53 in the same way as switch 57–62.

The stepwise advance proper of the program control card is realized by the following mechanism while feeler pins 23 are moved away from the program control card in the manner described above. Secured to shaft 14 which carries wheel 13 connected by means of band 12 and dog 11 to the program control card, is a ratchet wheel 63 (FIGS. 2 and 8–10). In the initial position of the device a pawl 64 engages the ratchet wheel 63 to prevent a return of the program control card by spring 16. The pawl 64 is mounted on end wall 1 by means of a pin 65 and is under the influence of a tension spring 66 which is extended between the pawl and the shaft 54 and which tends to hold the pawl permanently engaged with the ratchet wheel 63. The pawl 64 also has a nose 67 laterally of the ratchet wheel 63 for a purpose indicated in the following.

Mounted for swinging movement on shaft 14 is an arm 68 which has a free, V-shaped end portion 69 and a second free end portion 70 which is connected to one end of a tension spring 71 which has its other end connected to shaft 54. Spring 71 holds the V-shaped end portion 69 of arm 68 permanently applied against two rollers 72 which are mounted on the side of arm 49 facing end wall 1, which arm is secured to main drive shaft 37.

A feed pawl 74 is pivotally mounted on arm 68 by means of a pin 73. Said feed pawl has a feed tooth 75 adapted to engage ratchet wheel 63, a lug 76 adapted in certain cases to engage nose 67 on pawl 64, and a lug 77. A tension spring 78 extended between pawl 74 and arm 68 tends to swing the pawl clockwise from the initial position according to FIG. 8 to the position in FIG. 9, in which feed tooth 75 engages ratchet wheel 63, lug 76 is out of engagement with nose 67 on pawl 64, and lug 77 projects from one side of arm 68, as viewed longitudinally of shaft 14.

Furthermore, a bellcrank lever 79 belonging to a restoring means is mounted for swinging movement on shaft 14. One arm of this bellcrank lever has a lug 80, and a tension spring 81 extended between the other arm of bellcrank lever 79 and arm 68 tends to hold lug 80 in application against one side edge of arm 68, thereby holding lug 77 of feed pawl 74 inside said edge, as shown in FIG. 8. Spring 81 and lever 79 then keep pawl 74 swung against the action of spring 78 to the FIG. 8 position in which feed tooth 75 is disengaged from the ratchet wheel 63 and lug 76 of the feed pawl 74 is in position for engaging nose 67 of pawl 64.

The restoring means also comprises an electromagnet 82 which is secured to the underside of table 5 and has a swingable armature 83 which is applied against one arm of a two-armed lever 84. Said lever 84 is mounted by means of a shaft 85 on a trestle 86 which is attached to the underside of table 5. Lever 84 is under the action of a tension spring 87 which tends to hold lever 84 applied against armature 83. The arm of lever 84 which faces away from armature 83 extends up to one arm of bellcrank lever 79 to engage, under certain conditions, a shoulder 88 on lever 79 to prevent a swinging of said lever.

In the initial state the parts of the feed mechanism occupy the FIG. 8 position. If the program control card is to be advanced one step for feeling a new row of control holes, clutch 36, 38–40 is engaged to rotate main drive shaft 37 through half a revolution. By engaging the V-shaped end portion 69 rollers 72 of arm 49 swing step-advancing arm 68 first clockwise from the FIG. 8 position to the FIG. 9 position. As lever 84 occupies the FIG. 8 and FIG. 9 position because of electromagnet 82 being deenergized, lever 84 will prevent bellcrank lever 79 from partaking in the swinging of arm 68, by its engagement with shoulder 88. At this swinging movement arm 68 will as a consequence move away from lug 80 of bellcrank lever 79 so that spring 78 is able to swing the step-advancing pawl 74 clockwise about pin 73 in such a way that feed tooth 75 engages ratchet wheel 63 and during swinging of arm 68 clockwise advances the ratchet wheel 63 by one tooth pitch. Pawl 64 slides from one tooth gap to the following on the ratchet wheel 63 and is not actuated by lug 76 of the feed pawl 74, as said lug at the described swinging of pawl 74 by spring 78 has been moved to a position in which it cannot engage lug 67 of pawl 64. Since the ratchet wheel 63 is secured to shaft 14 said shaft is rotated through a given angle during the winding of band 12 onto wheel 13 so that spring 16 is extended and dog 11 moves the program control card by one hole position row pitch towards the right as viewed in FIGS. 4 and 5. The described advance of program control card starts only when feeler pins 23 have been moved away from the card in the manner earlier described by U-shaped member 55. Having reached the position in FIG. 9, rollers 72 during the latter part of the half revolution of the drive shaft 37 allow arm 68 to swing back to initial position in FIG. 8, in which arm 68 is applied against an abutment 91 on frame plate 52, under the action of spring 71, whereupon the parts return to the initial position in FIG. 8. The pawl 64 by its engagement with the ratchet wheel 63 prevents spring 16 from restoring dog 11 and thus the program control card to the left as viewed in FIG. 4. It is thus evident that the program control card can be advanced in this way by one hole position row pitch for each operating cycle of clutch 36, 38–40.

Figure 10:
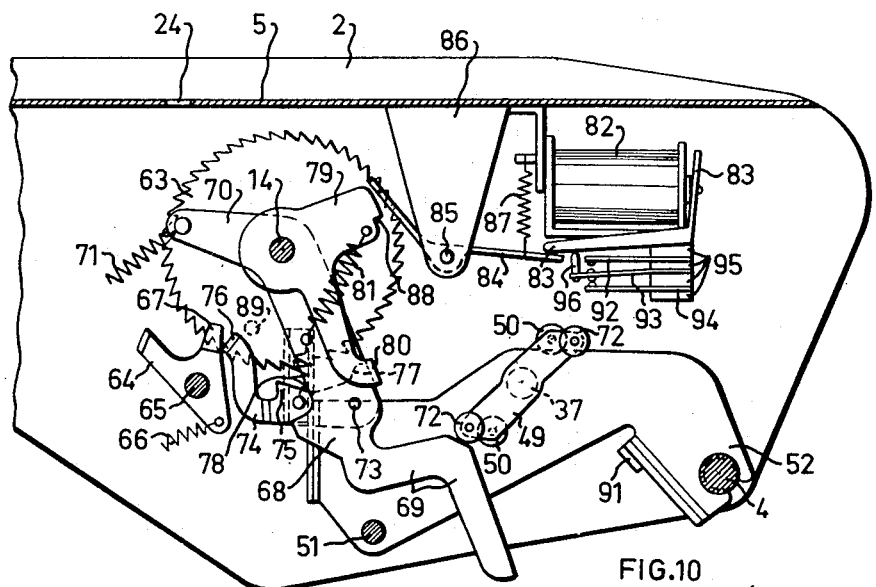
FIG. 10 is a view corresponding to FIGS. 8 and 9 but shows the parts in the position they occupy during the return of the program control card to initial position.

If the program control card is to be returned to its initial position to the far left in FIG. 4, electromagnet 82 is energized in some suitable manner, and electromagnet 44 is also energized for engaging clutch 36, 38–40. At the energization of electromagnet 82 armature 83 is attracted and swings lever 84 to the position shown in FIG. 10, in which lever 84 is outside the path of motion of shoulder 88 of bellcrank lever 79. When rollers 72 begin to swing arm 68 clockwise from the position in FIG. 8 to the position in FIG. 10 bellcrank lever 79 thus is not prevented by arm 84 from taking part in the clockwise movement of arm 68, whereby lug 88 of bellcrank lever 79 retains feed pawl 74 in the swung position shown in FIGS. 8 and 10 relative to arm 68. As a consequence, feed tooth 75 of feed pawl 74 is not engaged with ratchet wheel 63, and besides lug 76 of feed pawl 74 will during swinging of arm 68 engage nose 67 on pawl 64 so that said pawl is swung out of engagement with ratchet wheel 63. This will release ratchet wheel 63 so that spring 16 is able to pull back dog 11 and the program control card to the left as viewed in FIG. 4 to initial position while rotating ratchet wheel 63 counterclockwise as viewed in FIG. 8 until a pin 89 on the ratchet wheel is applied against an abutment 90 on frame plate 52 to determine the initial position of the control card. Since the return of the program control card may take a relatively long time and feeler pins 23 must be moved out of engagement with the card during the entire time of returning (the position according to FIG. 5) one-cycle clutch 36, 38–40 must temporarily be disengaged during its operating cycle approximately in the driving state of drive shaft 37 which is shown in FIG. 10, and this is realized by keeping clutch magnet 34 energized for so long time that arm 48 will engage a clutch hook 40 (FIG. 3) and temporarily disengage the clutch, as earlier described. When the program control card has returned to initial position the current supply to clutch magnet 44 is interrupted so that clutch 36, 38–40 is again engaged, completing its operating cycle for returning the parts of the feed mechanism to the FIG. 8 position. The current supply to electromagnet 82 is also interrupted.

In the embodiment illustrated armature 83 of electromagent 82 is adapted to actuate a switch which consists of three contact springs 92–94 (FIGS. 8–10) which have their one ends clamped between insulating disks 95. The free end of the intermediate contact spring 93 carries an insulating pin 96 over which said contact spring can be bent by armature 83. In the initial position according to FIG. 8 the contact spring 93 makes contact with spring 92, but when electromagnet 82 is energized armature 83 swings contact spring 93 away from contact spring 92 and instead moves contact springs 93, 94 into contact with each other. More than one switch may naturally be operated by armature 83. Switch 92–96 can be employed for optional purposes to indicate the state that electromagnet 82 is energized for returning the program control card to initial position, but it can also be employed to advantage for establishing a holding circuit for electromagnet 82 to retain armature 83 in attracted position during the entire returning of the program control card to the initial position so that the current pulse to electromagnet 82, which pulse releases the return of the program control card, can be made of short duration and be generated for instance in that a control hole is provided in a certain channel on the program control card.

In the embodiment illustrated wheel 13 (FIGS. 4 and 5) has a pin 97 which is adapted to actuate an operating arm 98 for a switch comprising three contact springs 99, 100 and 101 which have their one ends clamped between insulating disks 102. The intermediate contact spring 100 has an insulating pin 103 which is operable by arm 98. When the program control card occupies initial position, pin 97 on wheel 13 is applied against arm 98, as is shown in FIG. 4, and arm 98 presses via pin 103 contact spring 100 against contact spring 99. As soon as the program control card is moved out of initial position, wheel 13 is rotated in such a way that pin 97 allows operating arm 98 to spring away from pin 103 so that contact spring 100 goes into application with the contact spring 101 (FIG. 5). Wheel 13 may of course operate more than one switch in the manner described, and the switch or switches can be used in an optional way to deliver an indication of whether or not the program control card occupies initial position. Naturally a pin could also be attached to wheel 13 in such a position that it operates a switch in the manner described when the program control card occupies some other advance position in the guide path on table 5. Switch 98–103 may be connected for instance in series with the holding circuit of electromagnet 82 which passes through switch 92–96 and to which also electromagnet 44 can be connected so that the energization of electromagnets 44 and 82 is interrupted when the program control card reaches initial position, whereby clutch 36, 38–40 can be caused to complete its operating cycle, which was interrupted by arm 48, in the manner earlier described at the arrival of the program control card at initial position, the energization of the electromagnet 82 being simultaneously interrupted.

Figure 11:
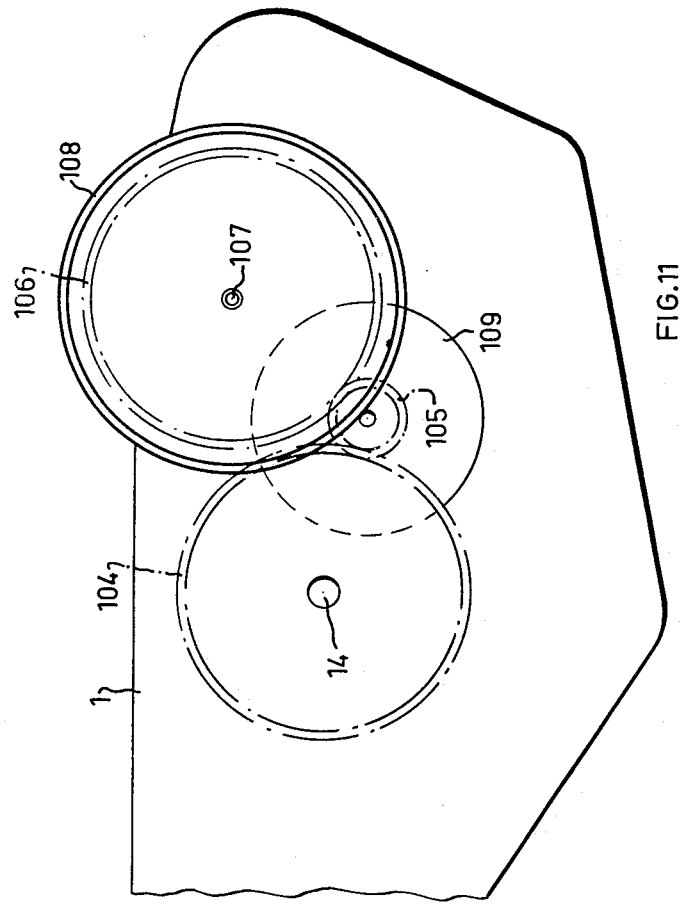
FIG. 11 is a side elevational view of a portion of the device with an indicating mechanism.

In order that the advance position of the program control card may always easily be read, a gear 104 is secured to shaft 14 outside end wall 1 (FIGS. 1, 2 and 11). Gear 104 engages an intermediate gear 105 mounted on end wall 1 and in turn engaging a gear 106 which is mounted on a pin 107 on end wall 1. Gear 106 carries a drum 108 on the periphery of which a series of digits are provided, corresponding to the ordinals of hole position rows 18 (FIG. 12) on the program control card. In the housing (not shown) of the device a window is provided opposite drum 108, through which one can read the digit on the drum which corresponds to the ordinal of that hole position row on the program control card which is being sensed by the feeler pins 23. Gear 105 is suitably connected to a centrifugal regulator 109 (only diagrammatically shown) of any suitable kind which limits the rotational speed of gear 105, thus providing that the program control card is returned in a smooth movement to initial position by spring 16.

What I claim and desire to secure by Letters Patent is:

1. A program control device adapted to handle a program control card having control holes in some of a plurality of control hole positions arranged in a square net of rows and channels, comprising a frame, guiding means on said frame defining a guide path for a control card parallel with the channels of control hole positions on the card, return spring means adjacent said guiding means adapted to bias a card towards an initial position along said guiding means, motor means, a feed mechanism, a one-cycle clutch, connected with said motor means and said feed mechanism for intermittently driving said feed mechanism, when engaged, through an operation cycle by means of said motor means, step feed means forming part of said feed mechanism and adapted to step a card in a feed direction along said guiding means against the bias of said spring means when said clutch is engaged and also hold a card in stepped position against the bias of said spring means, a series of movable control hole feeler means across the guide path defined by said guiding means and normally in a card engaging position when said clutch is disengaged, means biasing said feeler means against movement from said card engaging position, actuating means forming part of said feed mechanism and moving said feeler means only during the operation cycle of said feed mechanism to an inoperative position spaced from said card engaging position, restoring means coupled to said step feed means for disabling said step feed means, momentary disengagement means coupled to said clutch for temporarily disengaging said clutch during its operation cycle when said actuating means of said feed mechanism has moved said feeler means to their inoperative position, and operating means coupled to said restoring means and said momentary disengagement means, whereby a card is returned to its initial position by means of said return spring means without interference from said feeler means and said step feed means.

2. A program control device according to claim 1, further comprising means coupled to said clutch and responsive to localizing said card in its initial position and disabling said momentary disengagement means for reengaging said clutch to complete the operation cycle thereof after return of a card to its initial position.

References Cited by the Examiner
UNITED STATES PATENTS

| | | | |
|---|---|---|---|
| 2,247,905 | 7/1941 | Bryce | 235—61.11 |
| 2,819,020 | 1/1958 | Baer | 235—61.11 |

MALCOLM A. MORRISON, *Primary Examiner.*

WALTER W. BURNS, JR., P. J. HIRSCHKOP, W. S. POOLE, *Examiners.*